United States Patent
Morikawa et al.

(10) Patent No.: US 7,466,348 B2
(45) Date of Patent: Dec. 16, 2008

(54) IMAGING APPARATUS AND CONTROL METHOD UTILIZING BIOMETRIC INFORMATION

(75) Inventors: Goichi Morikawa, Kanagawa (JP); Go Tokura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 10/460,267

(22) Filed: Jun. 13, 2003

(65) Prior Publication Data

US 2003/0235411 A1 Dec. 25, 2003

(30) Foreign Application Priority Data

Jun. 20, 2002 (JP) ............................. 2002-180050

(51) Int. Cl.
H04N 5/76 (2006.01)
H04N 7/18 (2006.01)
G06K 9/00 (2006.01)

(52) U.S. Cl. ..................... 348/231.3; 348/161; 382/117

(58) Field of Classification Search ................ 382/117; 713/186; 340/5.53; 902/3; 348/207.99, 348/231.3, 78, 161; 396/18
See application file for complete search history.

(56) References Cited

U.S. PATENT DOCUMENTS

| | | | |
|---|---|---|---|
| 5,530,759 A | 6/1996 | Braudaway et al. | 380/54 |
| 6,433,818 B1* | 8/2002 | Steinberg et al. | 348/161 |
| 6,771,901 B2* | 8/2004 | Gennetten et al. | 396/297 |
| 6,930,707 B2* | 8/2005 | Bates et al. | 348/78 |
| 7,043,048 B1* | 5/2006 | Ellingson | 382/100 |
| 7,047,418 B1* | 5/2006 | Ferren et al. | 713/186 |
| 7,174,567 B2* | 2/2007 | Keramane | 726/26 |
| 7,200,419 B2* | 4/2007 | Shinzaki | 455/556.1 |
| 7,252,240 B1* | 8/2007 | Jones et al. | 235/492 |
| 7,305,089 B2* | 12/2007 | Morikawa et al. | 380/210 |
| 2003/0097350 A1* | 5/2003 | ShamRao | 707/1 |
| 2008/0225574 A1* | 9/2008 | Kim | 365/156 |

FOREIGN PATENT DOCUMENTS

| | | |
|---|---|---|
| JP | 8-504979 | 5/1996 |
| JP | 8-241403 | 9/1996 |
| JP | 10-150517 | 6/1998 |
| JP | 10-290359 | 10/1998 |
| JP | 2000-196998 | 7/2000 |
| JP | 2001-94847 | 4/2001 |
| JP | 2002-57928 | 2/2002 |
| WO | WO 94/09446 | 4/1994 |

OTHER PUBLICATIONS

Japanese Office Action dated Dec. 21, 2007, in Japanese Patent Application No. 2002-180050.

* cited by examiner

*Primary Examiner*—Justin P Misleh
(74) *Attorney, Agent, or Firm*—Fitzpatrick, Cella, Harper & Scinto

(57) ABSTRACT

A digital still camera records a photographer's biological information on a photographic image reliably and protects the copyright of photographic images without affecting processing, and in a manner transparent to operation, at the time of photographing a subject. Biological information (iris information) that is registered beforehand by the photographer is recorded as personal data on an ID card. If an image is taken in a state in which the ID card bearing the recorded personal data has been inserted into the apparatus, iris information that has been sensed by an iris sensor is checked when a power supply is turned on. If the two compared items of iris information match, the personal data is added onto the image of the photographed subject.

2 Claims, 10 Drawing Sheets

IMAGING APPARATUS AND CONTROL METHOD UTILIZING BIOMETRIC INFORMATION

FIELD OF THE INVENTION

This invention relates to an imaging apparatus for electrically taking the image of a subject. More particularly, the invention relates to an imaging apparatus with which it is possible to protect the copyright of the photographer.

BACKGROUND OF THE INVENTION

Digital still cameras and digital video cameras that have become increasingly popular in recent years convert an image signal, which is the result of sensing an image by an image sensing device such as a CCD sensor, to image data in a digital format and store this image data on a recording medium such as a memory card.

Such digital image data can readily be corrected, manipulated and printed by a computer and has come to be utilized in the ordinary home. At the same time, owing to the spread of networks, particularly the Internet, it is now easy for digital image data to be circulated among an unspecified number of users.

Against this background, the necessity for imaging apparatus such as digital still cameras and digital video cameras has grown explosively.

The widespread use of personal computers and the like has made the copying of digital data easier and less expensive. In addition, easier access to the Internet has facilitated and lowered the cost of distributing digital data. As a consequence, even ordinary individuals can now create and distribute copies of digital images easily and inexpensively for purposes beyond private use. Though acts such as the unauthorized copying and distribution of digital image data do not pose a major problem so long as it involves photography for personal enjoyment, such behavior has not gone unnoticed by those who circulate digital images as a business.

Thus, a problem which arises with regard to image data in digital form is that protection of the copyright of photographers, etc., is not satisfactory. Means for protecting copyright is strongly desired for digital image data obtained by photography.

A technique referred to as an "electronic watermark" has undergone extensive research for the purpose of realizing copyright protection of digital image data. This technique is one in which a portion of the data in digital image data or digital audio data is embedded with separate information by superposition in such a manner that the information is rendered insensible or intentionally sensible to a human being, depending upon the particular purpose. When necessary, only a user having the right or qualifications can extract or remove the embedded separate information from the digital data in which the electronic watermark has been embedded.

For the details of these techniques, see the specifications of Japanese Patent Application Laid-Open Nos. 10-290359 and 10-150517 and U.S. Pat. No. 5,530,759 (Japanese Patent Application Laid-Open No. 8-241403)

A number of methods have generally been employed for authenticating individuals. Examples are a method through which only a specific person is verified by a key, card or seal in his or her possession, and a method through which only a specific person is verified by entry of a password number known only by the person. A fundamental problem with this method is that it is comparatively easy for another person to pose as the specific person by way of theft, counterfeiting or leakage of information, etc.

Accordingly, a method that has become the focus of attention as an alternative to the above method is a biometric personal authentication method that employs a physical characteristic of a specific person to undergo authentication.

It is required that a physical characteristic be unique and person-specific, exhibit randomness and not change over a long period of time. In addition, when application to an apparatus for performing personal authentication is taken into account, facts to be considered are the time needed to acquire the data needed for authentication and the cost of the apparatus. At the present time, therefore fingerprints, palm prints, iris patterns, voice prints and facial appearance are in wide use as physical characteristics for use in authentication.

Japanese Patent Publication No. 8-504979 (Japanese translation of PCT International Publication WO94/09446) will be described in general terms with regard to the principle of personal authentication using an iris pattern.

FIG. 9 is a flowchart of processing up to a decision as to whether a person being tested is a specific individual or not.

First, the eyeball image of the person is acquired by controlling illumination and focus (1101). When the eyeball image is obtained, the eyelid and eyelash are detected, the pupil-iris boundary 21 and outer boundary 22 of the iris are detected, as shown in FIG. 10, and a coordinate system is set up upon dividing the eyeball into areas 23 referred to as analysis bands (1102).

Next, image analysis (1103), which mainly entails extracting a change in shading of the analysis bands, is performed, and coding is performed based upon the result of analysis (1104). The personal authentication code generated by coding is expressed by a fixed-length stream of bits indicated by "1"s and "0"s.

Matching is performed (1105) between the personal authentication code thus obtained by acquiring the iris pattern and coding the same and a personal authentication code 1107 serving as a template previously acquired from the specific individual and stored. More specifically, the degree of agreement between the two codes is calculated in accordance with a certain evaluation function and, if an evaluation value exceeds a fixed threshold value, it is decided that the two codes are personal authentication codes sampled from the same individual (1106).

Further, if a fingerprint or palm print is used for personal authentication, the image of the fingerprint or palm print of the person to be authenticated is acquired, the image is coded based upon ridge endings or ridge bifurcations, which are the minutia of the ridges that constitute the fingerprint or palm print, and matching is performed with a previously stored template through a procedure similar to that in the case of the iris pattern, thereby achieving personal authentication.

The specification of Japanese Patent Application Laid-Open No. 2000-196998 discloses a method that uses the above-described technique to embed eye information in a photographic image directly as a watermark.

In accordance with this method, an eyeball image is acquired at substantially the same time the image of a subject is taken by a camera, an iris pattern or retinal pattern is extracted from the eyeball image, and the extracted image or code based upon the image is embedded in the photographic image as photographer information. As a result, the photographic image and the photographer information are placed in one-to-one correspondence and there is no way for a third party to intervene. The embedded photographer information therefore is highly reliable as copyright information.

However, the above method necessitates the task of acquiring the eyeball image at approximately the same time that the image of the subject is taken. There are also cases where the method necessitates the additional task of extracting the iris pattern or retinal pattern from the eyeball image and converting this pattern to a personal authentication code by coding means that relies upon image processing. In a digital image sensing device such as a digital still camera, such a task is carried out, in terms of the processing sequence, at the timing at which maximum load is imposed upon processing of the subject image at the time of photography. When eyeball-image processing is executed along with processing of a captured image, therefore, the overall processing requires a great amount of time. This means that the photographer must wait a while before these processes are completed and the next photo can be taken, resulting in possible loss of photographic opportunities.

When the eyeball image of a photographer is acquired every time an image is taken, the photographer's eye may be closed at the moment of acquisition or an eyelash or strand of hair may interfere. In view of the fact that this can happen frequently, the eyeball image may not always be acquired properly. Furthermore, since the pupil of the photographer's eye opens when an image is taken under low illumination, as is the case indoors, the area of the iris pattern becomes comparatively small and it may not be possible to convert the pattern to an accurate personal authentication code.

Accordingly, the method of acquiring iris information at the same time that a subject is photographed is disadvantageous in view of the heavy processing load and involves the risk that authentication precision may be influenced by circumstances.

On the other hand, in order to record biological information of a photographer in a captured image without acquiring the biological information at the same time that the subject is photographed, it is necessary that the photographer register his/her own biological information in the imaging apparatus beforehand by some method. Repeating the registration operation with each use is very troublesome for the photographer. However, if the biological information is not updated with each use, the biological information registered initially will be recorded even in image data captured by another photographer sharing the same imaging apparatus. If this happens, it will not be possible to achieve the objective of recording copyright-related information while linking a photographic image and its photographer by biological information embedded in image data.

SUMMARY OF THE INVENTION

Accordingly, the present invention can eliminate the shortcomings mentioned above.

The present invention can provide an imaging apparatus which, in order to protect the copyright of a photographer with regard to a photographic image, is capable of acquiring biological information of the photographer accurately and of recording this biological information in the photographic image reliably.

According to the present invention, an imaging apparatus for taking an image of a subject by a prescribed image sensing device can be provided, with the apparatus comprising biological-information recording means for recording biological information of a photographer on a removable recording medium, and subject recording means which, if a recording medium on which biological information of a photographer has been recorded by the biological-information recording means has been loaded in the apparatus, is for recording the biological information, which has been recorded on the recording medium, in combination with the image of a photographed subject.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described with reference to the accompanying drawings.

First Embodiment

Figure 1:
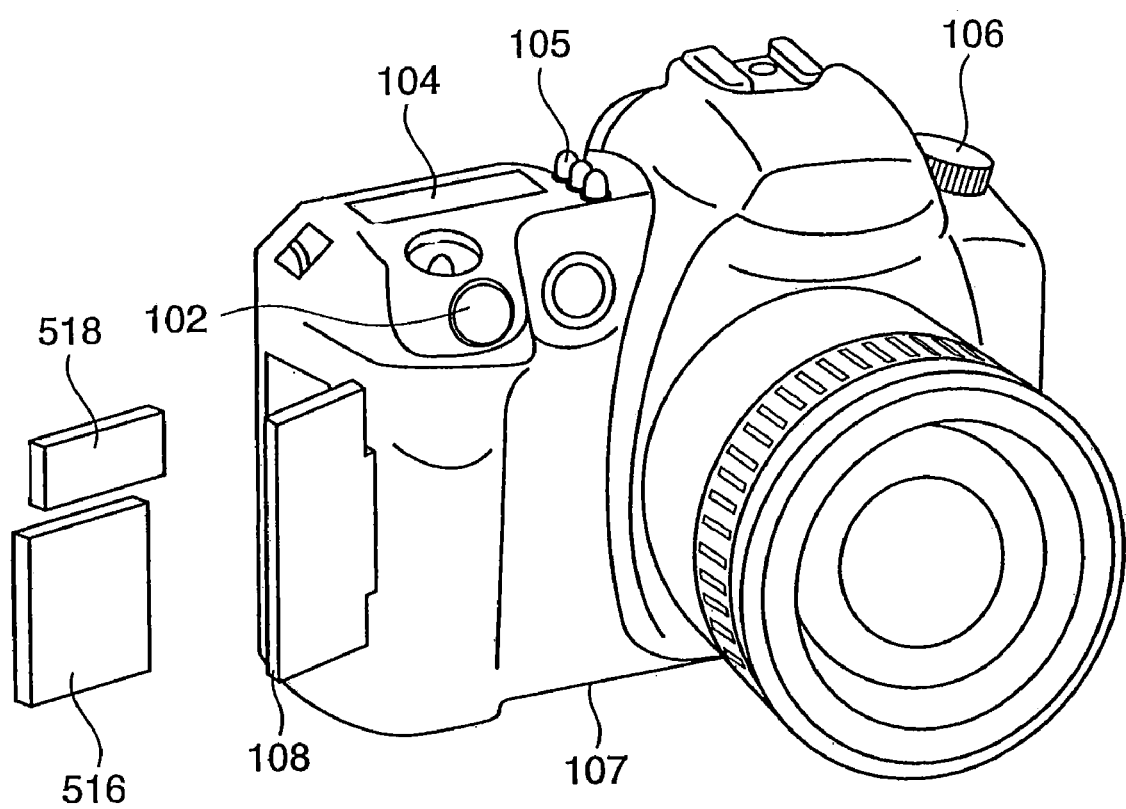
FIG. 1 is a front perspective view illustrating an embodiment of the present invention.

FIG. 1 is a front perspective view of a digital still camera according to an embodiment of the present invention. This embodiment will be described taking as an example a case where a biological-information image to be acquired is an iris image.

Pressing a shutter button 102 on the digital still camera produces a photography-start signal in response to which the image of a subject is captured by an image sensing device. A liquid crystal panel 104 for displaying photographic information is capable of displaying shutter speed and f-stop value or the set photographic mode, etc. A group 105 of setting buttons is for making various settings. A mode dial 106 is for changing over the mode of photography. A grip portion 107 is provided in order that a photographer may hold the camera. Part of the grip 107 can be opened and closed by a side cover 108. This makes it possible to insert and remove a memory card 516 and an ID card 518, which will be described later.

Figure 2:
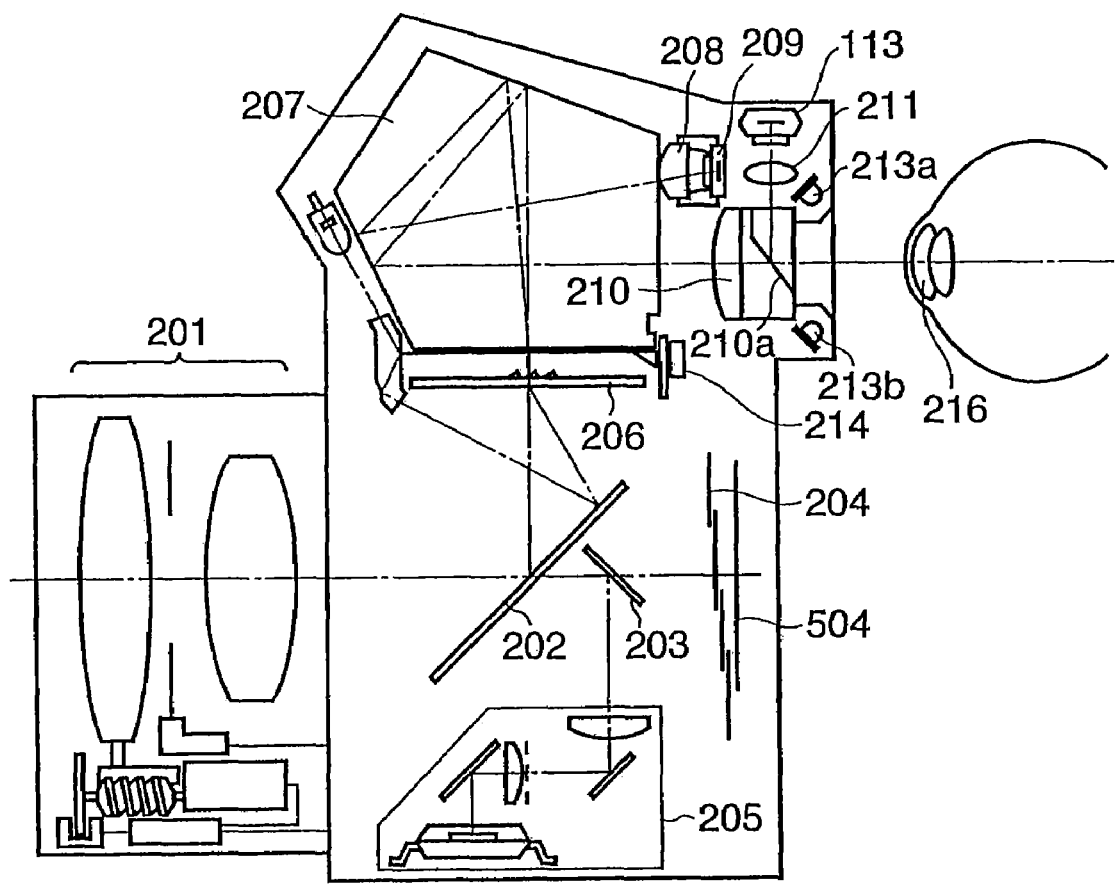
FIG. 2 is a sectional schematic view illustrating a principal portion of this embodiment.

FIG. 2 is a sectional schematic view illustrating a principal portion of the digital still camera according to this embodiment. A group 201 of photographic lenses is shown to be composed of two lenses for the sake of convenience, though a number of lenses are provided in actuality. A main mirror 202 is inclined with respect to the optical path of photography in a case where the camera is in a state for observing the image of the subject by the viewfinder system. The main mirror 202 is retracted from the optical path of photography if the camera is in a state for taking the image of the subject. A subordinate mirror 203 reflects light, which has passed through the main mirror 202, toward a focal-point detector 205 situated at the lower part of the camera body. An image sensing device 504 is a CCD or CMOS area sensor, etc. A shutter 204 opens when the image sensing device 504 is exposed to light.

A focusing plate 206 is disposed on the image-forming plane of the photographic lens group 201. A pentagonal prism 207 is for changing the optical path of the viewfinder. An image forming lens 208 and a photometry sensor 209 are for judging the luminance of the image of a subject.

An ocular lens 210 having a spectroscope 210a is placed rearwardly of the light-exit side of the pentagonal prism 207 and is used by the photographer to observe the focusing plate 206. The spectroscope 210a comprises, e.g., a dichroic mirror for transmitting visible light and reflecting infrared light.

An iris sensor 113, which employs an image sensing device such as a CCD, is placed so as to become the conjugate of the pupil 216 of the photographer's eye situated at a prescribed position in relation to a light-receiving lens 211. Infrared light-emitting diodes 213a, 213b illuminate the vicinity of the photographer's pupil. An LCD 214 inside the viewfinder, which is placed at a position where it can be observed by the photographer at the same time that the photographer observes the finder image, displays various settings information, etc.

Light from the iris of the photographer is reflected by the spectroscope 210a and has its image formed by the light-receiving lens 211 on the iris sensor 113, whereby the iris image is obtained.

Figure 3:
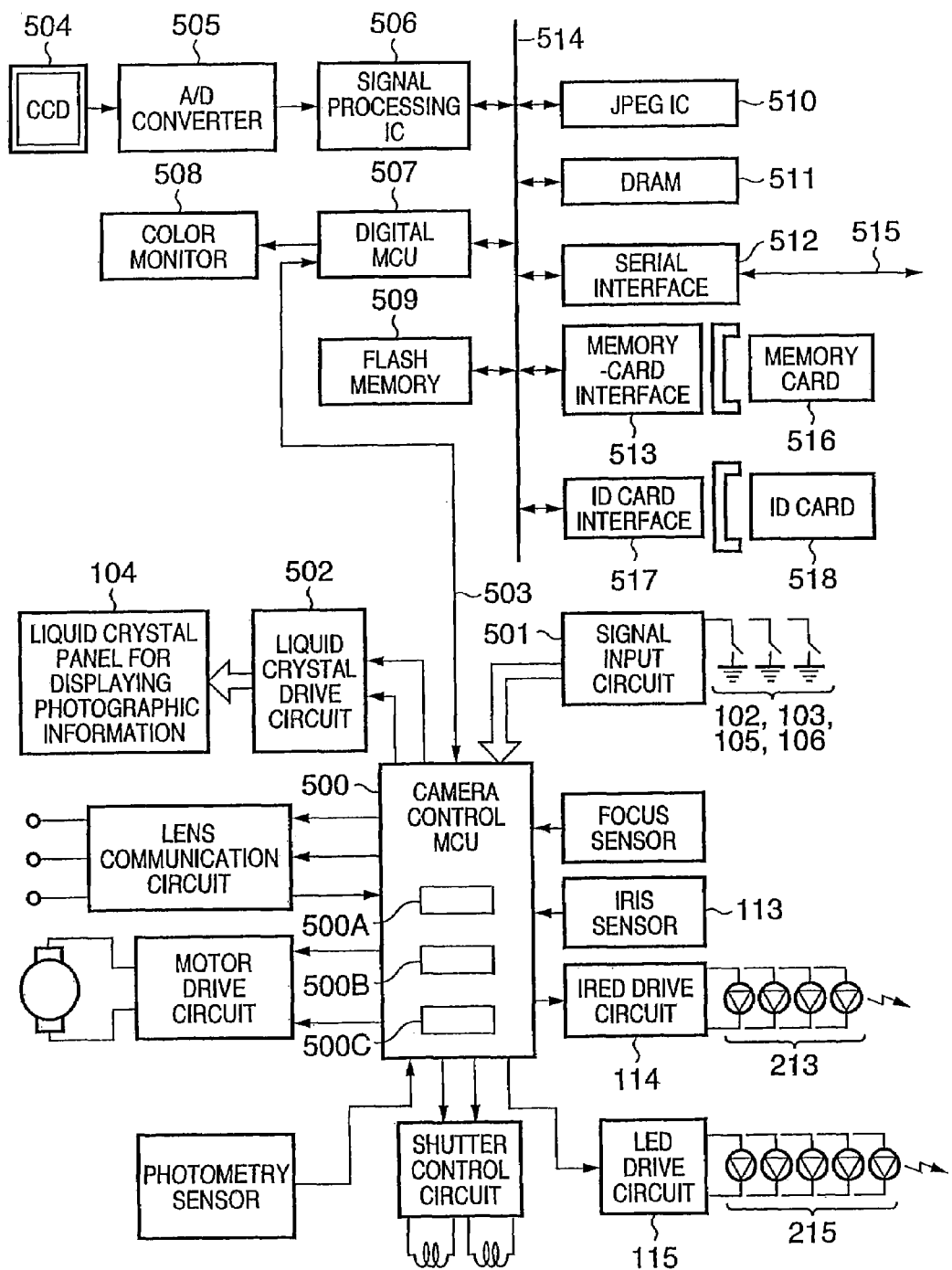
FIG. 3 is a block diagram illustrating the principal electrical circuitry of this embodiment.

FIG. 3 is an electrical block diagram illustrating a digital still camera according to this embodiment. A microcontroller (referred to as an MCU below) 500 is for controlling the camera. Connected to the MCU 500 are camera control circuits and sensors such as the iris sensor 113, an IRED drive circuit 114 for driving the infrared light-emitting diodes 213 that illuminate the vicinity of the pupil, an LED drive circuit 115 for driving the high-luminance light-emitting diode 215, a signal input circuit 501 and a liquid crystal drive circuit 502.

Provided internally of the MCU 500 for camera control are a ROM 500A storing a program for executing camera operation, a RAM 500B for storing a variable, and an EEPROM (electrically erasable programmable ROM) 500C for storing correction data and other parameters.

The iris sensor 113 senses the iris of the photographer and transmits the resulting electrical signal to the camera control MCU 500. The latter converts this transmitted analog electrical signal to digital image data and stores this image data in a RAM successively.

The signal input circuit 501 transmits the states of various camera switches to the camera. Signals from the shutter button 102, group 105 of setting buttons and mode dial 106 also are transmitted to the MCU 500 via this circuit.

The liquid crystal drive circuit 502 is capable of displaying various information on the liquid crystal panel 104, which is for displaying photographic information and is disposed on the outside of the camera, in accordance with a command from the MCU 500.

The camera control MCU 500 is connected to a digital MCU 507 by a signal line 503. The digital MCU 507 controls the photography of a digital image in accordance with a command from the camera control MCU 500. The digital MCU 507 controls various devices relating to photography in accordance with a program stored beforehand in a flash memory 509. By pressing the shutter button 102, the image of a subject is formed on the image sensing device 504, the analog output signal whereof is subjected to an A/D conversion by an A/D converter 505. The resulting digital data is subjected to color interpolation processing and filtering processing, etc., by a signal processing IC 506, after which the processed data is stored temporarily in a DRAM 511 via a data bus 514.

The digital image data that has been stored in the DRAM is displayed on a color monitor 508 when necessary.

The digital image data is integrated with copyright information through a method described later, after which the resulting data is compressed by a JPEG IC 510. The compressed image data is written to the removable memory card 516 via a memory-card interface 513. Further, the image data can also be output to a serial bus 515 via a serial interface 512.

The ID card 518 is a removable memory card or the like managed by an individual photographer. The iris information of the photographer is recorded in the ID card 518. The ID card 518 communicates with the digital MCU 507 via the ID card I/F 517 to transmit/receive the iris information.

<Processing for Registering Personal Authentication Information>

Figure 4:
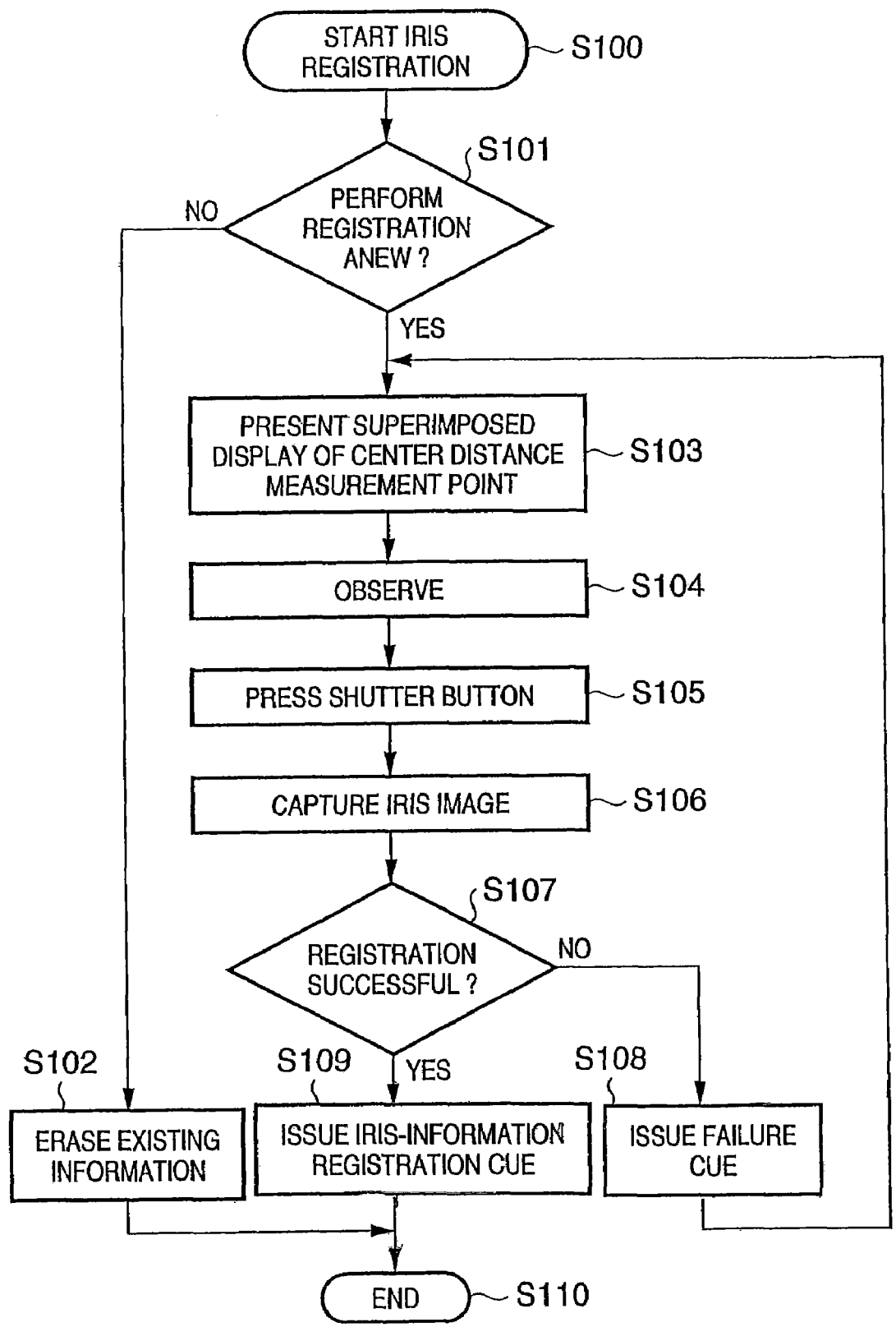
FIG. 4 is a flowchart illustrating processing for registration of iris information according to this embodiment.

FIG. 4 is a flowchart illustrating the flow of processing for registering photographer iris information in the digital still camera according to this embodiment.

At step S100 in FIG. 4, the photographer sets the mode dial 106 to a "REG" position to start iris registration. This position will be described.

Figure 5:
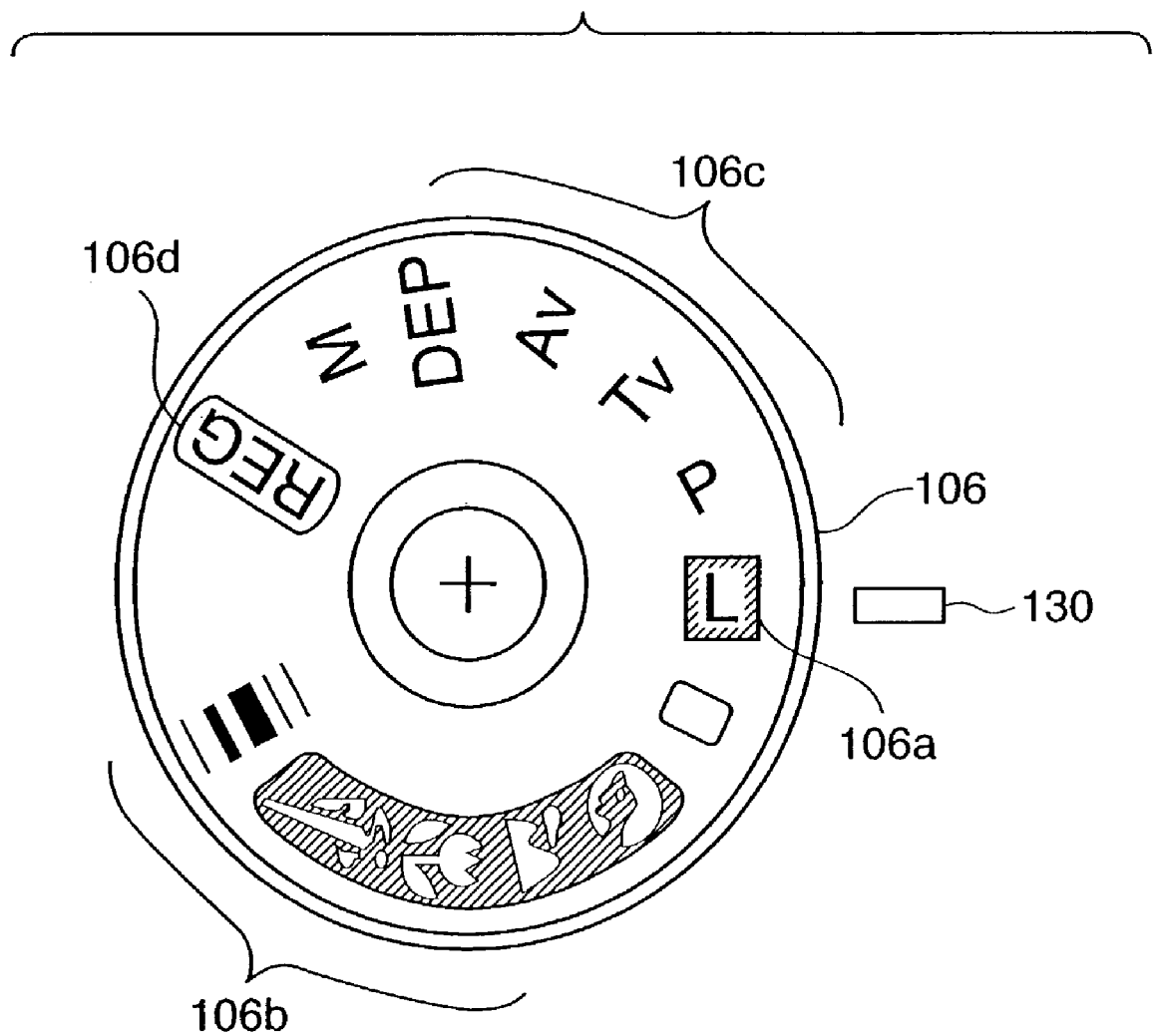
FIG. 5 is a diagram of a mode dial.

FIG. 5 is a detailed view of the mode dial 106 of FIG. 1 when viewed from the top of the camera. When an indication on the mode dial 106 is set to an index marker 130 formed on the camera body, the mode of photography is set based upon the nature of the indication. A position 106a indicates a locking position for rendering the camera inoperable. This indicates that the power supply has been turned off. The camera starts operating in response to the mode dial 106 being turned to a position other than the locking position 106a. A position 106b is for setting the mode of photography to an automatic photography mode in which the camera is controlled by a photography program configured in advance, and a position 106c is for setting the mode of photography to a manual photography mode in which the photographer can set the details of photography. The manual photography mode includes various modes of photography, such as program AE, shutter priority AE, f-stop priority AE, subject depth-of-field priority AE and manual exposure. A position 106d is a "REG" position for setting the mode of photography to the iris registration mode. This is the mode in which the photographer's iris information is registered.

With reference again to FIG. 4, when the photographer sets the mode dial 106 to the "REG" position 106d at step S100, control proceeds to step S101. Here a selection is made as to whether the operation to be performed next is new registration of an iris or erasure of information concerning already existing iris data. More specifically, the photographer operates the setting buttons in accordance with indications displayed on the liquid crystal panel 104 for displaying information and on the LCD 214 inside the viewfinder. If information concerning existing iris data is to be erased ("NO" at step S101), control proceeds to step S102, where all information concerning existing iris data is erased. Processing is then terminated (step S110).

Figure 6:
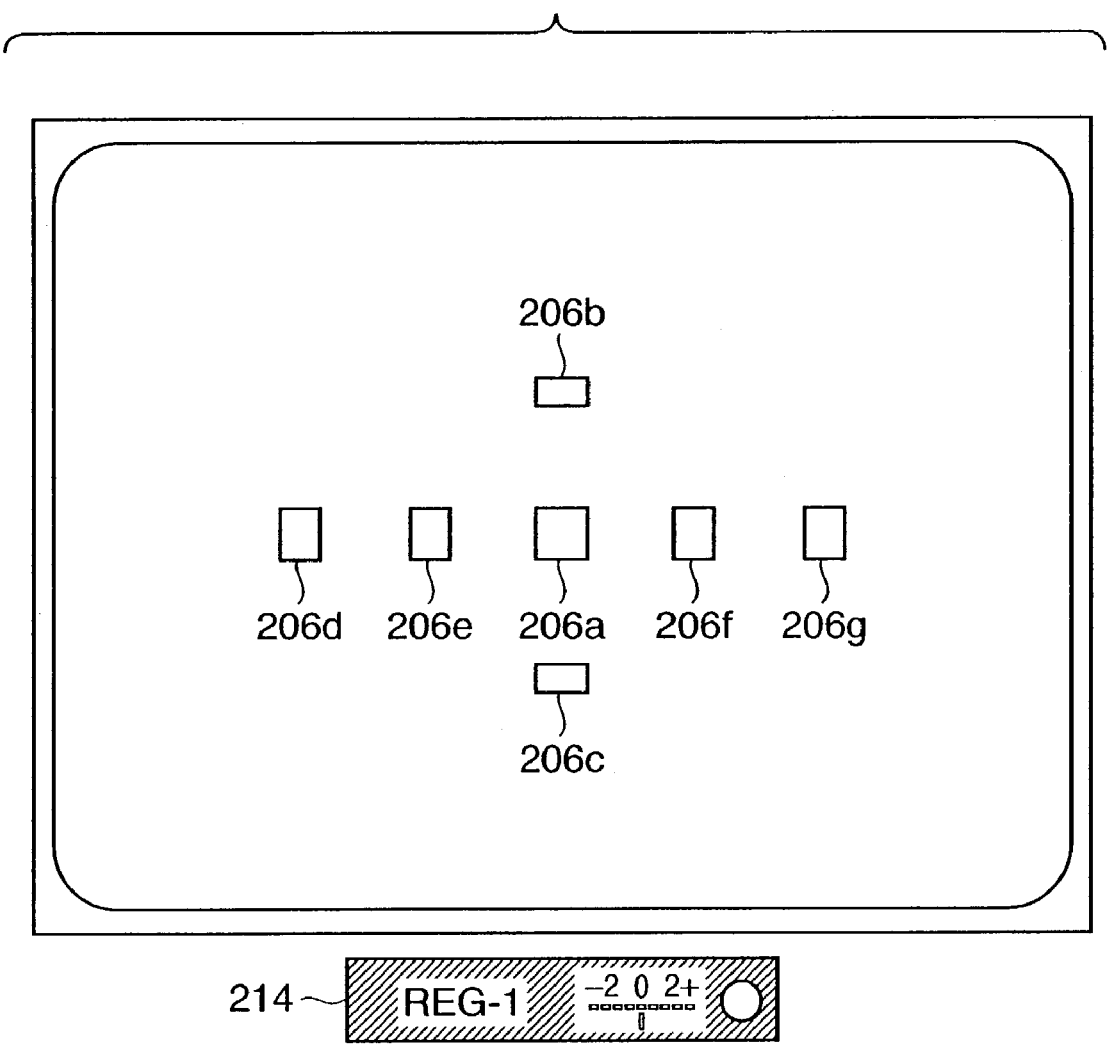
FIG. 6 is a diagram illustrating what is observed in a viewfinder.

The manner in which a photographer observes the viewfinder will be described with reference to FIG. 6. Areas 206a to 206e in FIG. 6 are focus detecting areas written on the focusing plate 206. Detection of focus is possible in a space corresponding to any one of the areas 206a to 206e. In order to notify the photographer of the area selected, the area is lit by the high-luminance light-emitting diode 215. Emission of light in any one area shall be referred to as "superimposing" below. The LCD 214 in the viewfinder displays the set state of the camera. This display makes it possible to notify the photographer of which state has been set.

If new iris registration is selected ("YES" at step S101), control proceeds to step S103, where a transition is made to a routine for actually acquiring the iris information of the photographer. The fact that the present state is acquisition of iris data anew is displayed on the LCD 214 in the viewfinder, as shown in FIG. 6, and area 206a which is the focus detection area at the center of the viewfinder, is superimposed at the same time.

Steps S104 and S105 are implemented by the photographer. The photographer gazes at the centrally located focus detection area 206a at step S104 and presses the shutter button 102 at step S105 while gazing at the area 206a.

Figure 9:
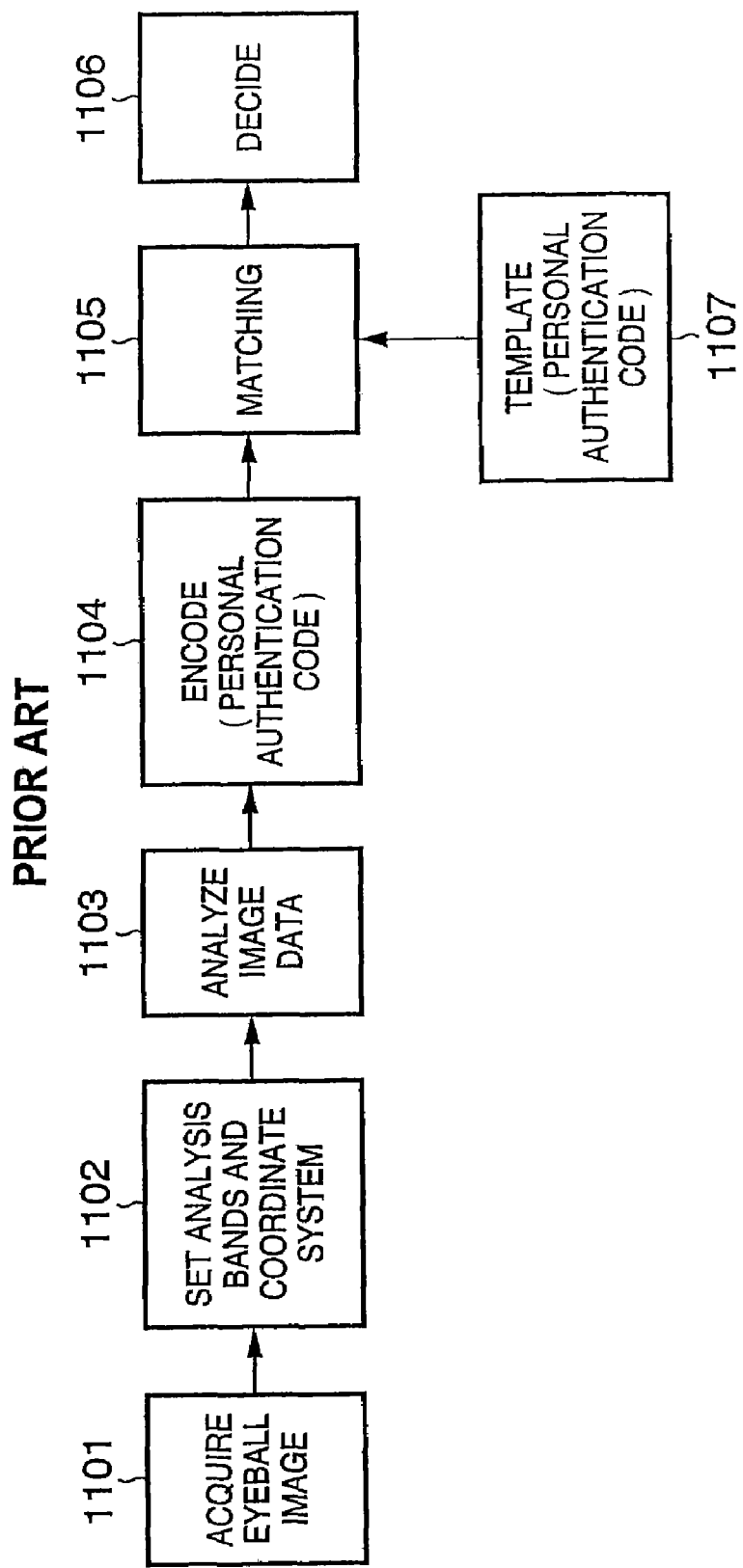
FIG. 9 is a processing diagram relating to personal authentication using an iris image.

When the shutter button 102 is pressed, the camera captures the photographer's iris image reflected by the spectroscope 210a and formed by the light-receiving lens 211 on the iris sensor 113 (S106). The captured iris image is recorded as iris information in the form of the image per se or after being processed into a personal authentication code through the procedure of steps S1102 to S1104 in FIG. 9.

It is determined at step S107 whether iris information has been acquired acceptably to such a degree that it is satisfactory as personal data indicative of the photographer, i.e., to such a degree that an identity match can be discriminated. If the iris information has not been acquired acceptably, then a cue indicative of failure is presented at step S108. For example, an electronic tone is issued or the fact that acquisition failed is displayed on the LCD 214 in the viewfinder. Control then returns to step S103. If it is determined at step S107 that acquisition was performed acceptably, control proceeds to step S109. Here a cue indicating that registration succeeded is presented to notify the photographer that registration of iris information has ended.

In the processing above, photographer iris information that has been registered is written from the digital MCU 507 to the ID card 518 via the ID card interface 517, whereby the information is recorded. For example, the manipulation of an iris image into iris information is performed at step S106 by the digital MCU 507 that has read in the iris information. At the same step, the manipulation into iris information and the recording of the information on the ID card 518 are carried out and the iris information is registered.

The ID card on which the photographer has recorded his/her own iris information can be managed separately of the camera. If the ID card is inserted into the camera when an image is to be taken, then the iris information that has been registered on the ID card will be added onto the image data that represents the image of the subject photographed through a certain photographic sequence. This adding on of the iris information will take place is response to an operation to turn off the camera power supply or in response to a signal to eject the memory card 516. Methods of adding on the iris information include a method of embedding the iris image itself as an electronic watermark, a method of embedding a personal authentication code as an electronic watermark and a method of writing a personal authentication code as one item of image metadata, which is ancillary information attached in order to describe a photographic image. Image information in which iris information has thus been embedded as an electronic watermark is processed through a procedure that conforms to the procedure used to embed by electronic watermarking, thereby making it possible to reproduce the original personal authentication information. Alternatively, if the iris information has merely been added on as ancillary information, then the personal authentication information can be acquired from this ancillary information.

Personal authentication information obtained from an image is compared with template personal authentication information possessed by the photographer, thereby making it possible to identify the photographer of the image. This information thus functions as copyright management information. Further, by embedding personal authentication information in an image as an electronic watermark, the personal authentication information can be utilized to identify the photographer also in a case where an image is copied or altered.

<Photography Pre-processing>

Figure 7:
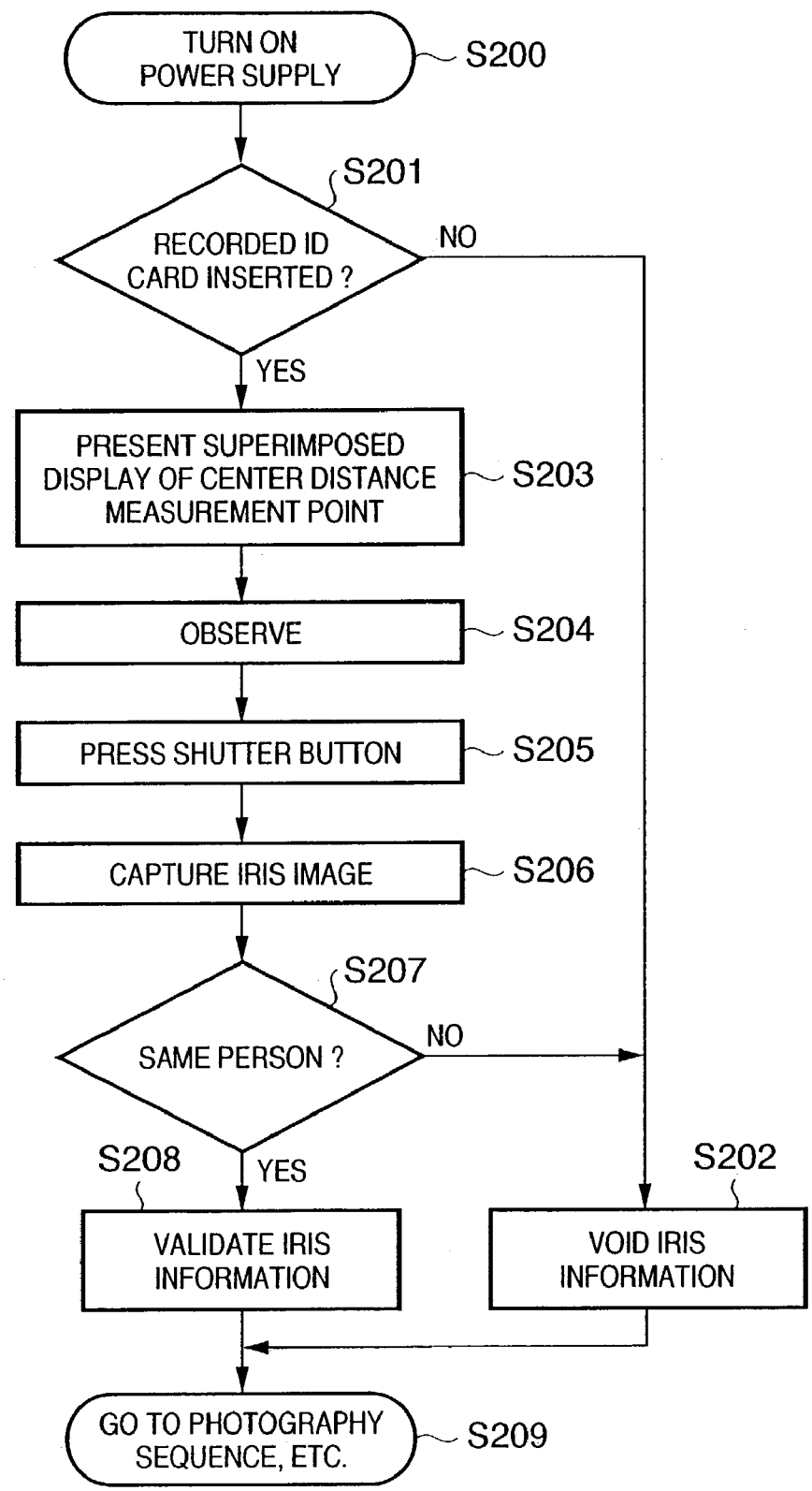
FIG. 7 is a flowchart illustrating processing for performing an identity check.

Reference will be had to FIG. 7 to describe operation when an ID card on which iris information has already been recorded is inserted into the camera and the camera power supply is then turned on.

When the camera power supply is turned on by the photographer at step S200 in FIG. 7, it is determined at step S201 whether the ID card has been inserted into the camera and, if the ID card has been inserted, whether iris information has already been recorded on the card. If a recorded ID card has not been inserted ("NO" at step S202), control proceeds to step S202. Here all processing relating to the adding on of iris information in the image of a subject is voided, after which control proceeds to a photography sequence (S209). In this case, if the photographer executes the iris-information registration processing of FIG. 4 and records his/her own iris information on the ID card anew, then the addition of iris information to the image of a subject can be validated.

The determination as to whether iris information has been registered on the ID card can be carried out by discriminating whether a specific character string or the like is included in part of the title or in the attribute information of the data file containing the iris information. In this case, it is necessary that this data file be given, as part of the title or as an attribute, a specific character string or the like indicating that the file is one containing personal authentication information.

If it is determined at step S201 that an ID card on which iris information has already been recorded has been inserted, then control proceeds to step S203. Here the liquid crystal panel 104 for displaying photographic images and the LCD 214 inside the viewfinder present a display to the effect that an identity check will be made to determine whether the iris information that has been recorded on the ID card and the iris information of the photographer who just turned on the power supply match. The area 206a which is the focus detection area at the center of the viewfinder, is superimposed at the same time that the display is presented.

Steps S204 and S205 are implemented by the photographer. The photographer gazes at the centrally located focus detection area 206a at step S204 and presses the shutter button 102 at step S205 while gazing at the area 206a.

The camera (MCU 507) captures the photographer's iris image reflected by the spectroscope 210a and formed by the light-receiving lens 211 on the iris sensor 113.

Figure 10:
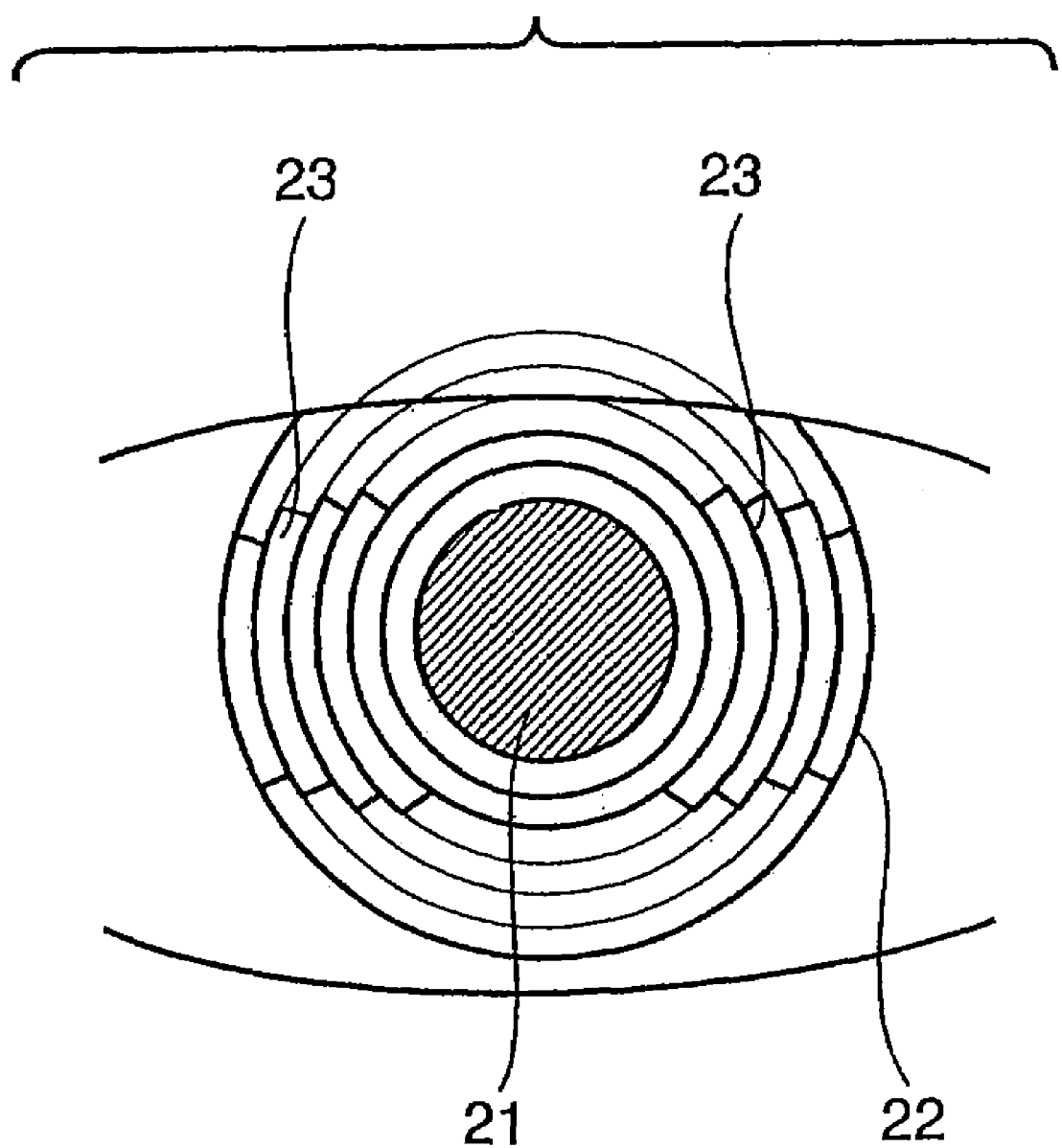
FIG. 10 is a diagram useful in describing the setting of coordinates of an eyeball image.

The captured iris image is subjected to image analysis through processing similar to that described above with reference to FIGS. 9 and 10 for authenticating a person based upon an iris pattern. Specifically, the iris portion is divided into analysis bands, a coordinate system is set up and image analysis based upon the extraction of a change in shading is executed. Coding is performed based upon the result of analysis and the code is processed into a personal authentication code serving as iris data (S206).

The MCU 507 reads the personal authentication code out of the iris information recorded on the ID card 518 and determines at step S207 whether this personal authentication code matches the personal authentication code that was generated at step S206. If it is determined based upon the result of the comparison that the two personal authentication codes were not taken as samples from the same individual, then control proceeds to step S202. Here all processing relating to the addition of iris information to the image of a subject is voided, after which control proceeds to the photography sequence (S209).

On the other hand, if it is determined that both codes where sampled from the same individual, an electronic tone is issued for a prescribed length of time using a sound generator (not shown) and, at the same time, an indication that a match has been obtained is displayed on the liquid crystal panel 104 and on the LCD 214 within the viewfinder, thereby notifying the photographer (S208). From step 8209 onward, the iris information that has been recorded on the ID card is handled as being valid and the iris information is added onto the image of the photographed subject. The iris information is combined with the image of the subject as an electronic watermark and the combined image is recorded on the memory card 516. Alternatively, the iris information can be added onto ancillary information relating to the image of the subject.

By virtue of the above procedure, iris information of a photographer and iris information that has been recorded on an ID card are compared when the camera power supply is turned on. Provided that the compared items of information agree, the iris information that has been registered on the ID card will be added onto the images of subjects photographed until the power supply is turned off. As a result, a procedure that entails capturing and manipulating the photographer's iris information whenever an image is taken is unnecessary, and personal authentication information that is based upon the iris information can be added onto an image reliably even at short imaging intervals. Further, in a case where photographer authentication is performed at the start of photography and the personal authentication information of the photographer does not agree with the personal authentication information that has been recorded on the ID card, images can still be taken but without adding the personal authentication information to the images of the photographed subjects. Accordingly, even if the ID card has not been inserted into the camera or even if an ID card bearing recorded personal authentication information different from that of the photographer has been inserted into the camera, photography itself can be carried out. In this case, personal authentication information different from that of the rightful photographer can be prevented from being added onto a photographic image. The embedding of iris information in or the addition of iris information to ancillary information may be performed whenever an image is taken or during photography idle time. Alternatively, this may be carried out collectively when a memory card is exchanged or when the camera power supply is turned off.

The processing shown in FIG. 7 is such that if an ID card bearing registered personal authentication information has not been inserted when the camera power supply is turned on, personal authentication information will not be added onto captured images until the next time the power supply is turned off and then turned on again. However, it may be so arranged that if the ID card has been inserted in a state in which the power supply is on, this will serve as the trigger to execute processing from step S201 onward in FIG. 7.

<Example of Electronic Watermarking Technique>

An example of an electronic watermarking technique in this embodiment will now be described in simple terms.

First, an original image (digital image data that has been captured by a camera) is divided into a plurality of blocks each of which is composed of n×m pixels. Next, an orthogonal transform such as a discrete cosine transform (DCT) is applied to each block obtained by division, thereby obtaining an n×m matrix of frequency components. Before embedding data, an embed component, which indicates in which component of the frequency-component matrix obtained by the orthogonal transform processing the data is to be embedded, is decided based upon a random number, an amount of alteration indicating the extent to which the value of this frequency component will be altered is decided, then the embed component and the amount of alteration are acquired and stored as key information.

By selecting, e.g., a low-frequency portion of the frequency-component matrix as the embed component, the data can be embedded so as not to be sensible by a human being. Further, by changing the amount of alteration, the difference relative to the original value of the frequency-component matrix can be changed. This makes it possible to control the decline in image quality.

The value of the frequency-component matrix of each selected block is changed based upon the embed component and amount of alteration serving as key information, thereby embedding embed data. Furthermore, the frequency-component matrix of each block in which the embed data has been embedded is subjected to an inverse orthogonal transform to obtain an image of a plurality of blocks of n×m pixels each.

Finally, images of the plurality of blocks obtained by the inverse orthogonal transform are connected to obtain a watermark image in which embed data has been embedded.

By embedding iris information in the image of a subject as embedded information by the above-described electronic watermarking technique, the iris information constituting biological information is distributed over the entire image of the subject. As a consequence, the biological information will not readily be lost by image manipulation or the like.

Second Embodiment

Figure 8:
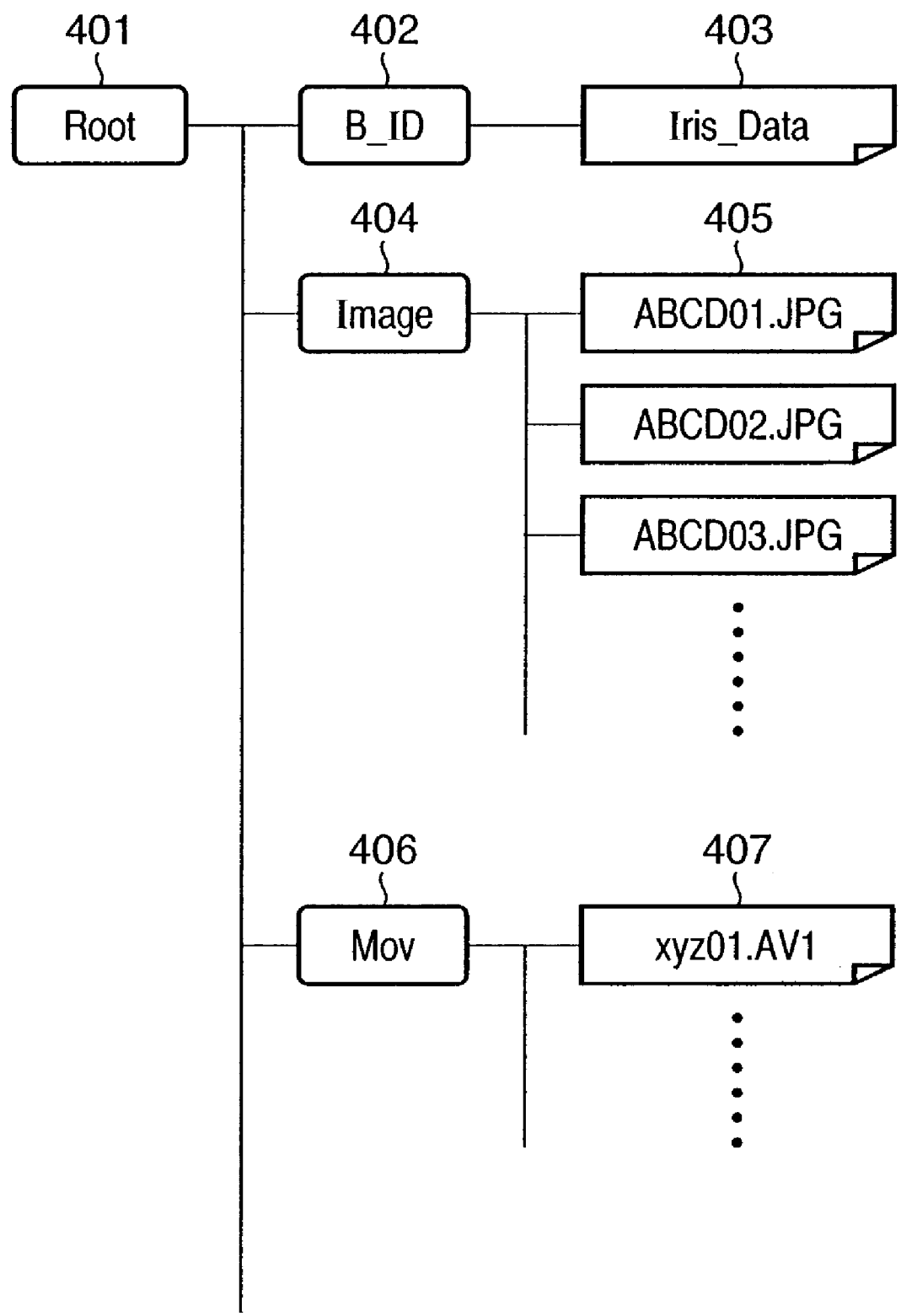
FIG. 8 is a diagram useful in describing the file structure of an image recording medium.

A digital still camera according to a second embodiment of the invention will now be described. This embodiment is equivalent to the first embodiment except for the fact that the function of the ID card 518 described with reference to FIG. 3, etc., is performed by the memory card 516. More specifically, part of the storage area of memory card 516, which is for storing data such as the images of subjects, is allocated for the purpose of storing iris information. The file structure of the storage area of memory card 516 is illustrated in FIG. 8. Here folders classified according to function, in the manner of an image directory 404 that stores an image-file group 405 of images of subjects and a moving-image directory 406 that stores a file group 407 of moving images, exist under a root directory 401. A biological-information directory (B_ID) 402 that stores the biological information of a photographer is provided as one folder, and a file (Iris_Data) 403 that describes iris information is stored in this folder.

If this arrangement is adopted, the independent separate ID card of the first embodiment is eliminated and the function of the ID card is unified with that of the memory card. The ID card interface 517, therefore, is unnecessary. Further, in the verification made when the power supply is turned on, i.e., step S201 in FIG. 7, it is determined whether the memory card rather than the ID card has been inserted and whether valid iris information has been recorded on the memory card rather than the ID card is verified.

Thus, in accordance with the first and second embodiments as described above, a personal-data recording medium (the ID card 518 in the first embodiment or the memory card 516 in the second embodiment), on which a photographer has recorded his/her own biological information (e.g., iris information), is managed. If an image is taken in a state in which the personal-data recording medium has been inserted, personal data that has been registered previously on the personal-data recording medium will be recorded on the image of the photographed subject. As a result, there is no danger that the image of a subject photographed by a certain photographer will have biological information of another person recorded on it, and there is little risk that one's own biological information will be recorded on the image of a subject photographed by another person. Furthermore, the registration of biological information is carried out in advance at a time different from that at which the image of a subject is captured. This makes it possible to mitigate processing load at the time that the image of a subject is taken, which is when the load is heaviest in the sequence of photography. As a result, a camera according to the present invention has an improved ability to shoot successive frames. At same time, it is possible to perform registration again when information inappropriate for personal authentication could only be acquired. This makes it possible to acquire reliable biological information.

Further, whether biological information that has been written to an already loaded personal-data recording medium and biological information of a photographer presently using the camera belong to the same person is checked, and the personal data that has been written to the personal-data recording medium is added onto the image of a photographed subject only when an identity match is verified. As a result, who took the image of a subject of interest can be determined with a high degree of reliability.

Furthermore, an imaging apparatus generally requires use of a removable image recording medium (the memory card in the above embodiments) in order to record captured images. Since this medium is used also as the personal-data recording medium, a user need not take the trouble to carry about and manage these media separately.

Modifications of First and Second Embodiments (1) The above embodiment relates to a case where an image representing acquired biological information is iris information. However, the process from acquisition of the biological image to the decision regarding personal identification is the same also with regard to a fingerprint image or palm-print image. Therefore, if the camera grip 107 shown in FIG. 1 incorporates a fingerprint or palm-print sensor, these items of information can also be handled in the same manner as an iris image and either image may be used as a biological-information image.

(2) In the above embodiments, whether an ID card or memory card bearing recorded iris information has been inserted or not is checked when the power supply is turned on. However, it is also permissible to make this determination at a timing at which it is believed a change in photographers has occurred. For example, the determination can be made immediately after a memory card is changed.

(3) Furthermore, though the above embodiments assume that the imaging apparatus is a digital still camera, the invention is applicable also to an imaging apparatus such as a digital video camera that satisfies the above-described structural requisites.

As many apparently widely different embodiments of the present invention can be made without departing from the spirit and scope thereof, it is to be understood that the invention is not limited to the specific embodiments thereof except as defined in the appended claims.

What is claimed is:

1. A digital camera having a viewfinder, for recording a captured image as digital image data, comprising:
    a digital image data generator for digitizing an output signal from an image sensor disposed in a focal plane;
    an obtainment unit configured to obtain iris information of a photographer by turning on a light emitting unit in the viewfinder for informing the photographer of a focus detecting area of said digital camera;
    a first interface for connecting an ID card on which iris information has been recorded, wherein said first interface is configured to accept a plurality of ID cards, each with the iris information of a different digital camera user;
    an iris information registration unit configured to record the iris information of a photographer obtained by said obtainment unit in the ID card;
    a check unit that checks whether iris information newly obtained by said obtainment unit and iris information having been recorded in the ID card connected with said first interface match, when the power is turned on and immediately after the ID card is changed;
    a second interface for connecting a memory card that records digital image data; and
    a controller that:
        i) determines whether an ID card has been connected to the first interface in response to the turning on of the supply of power to said digital camera;
        ii) determines whether the ID card connected to the first interface has iris information recorded thereon in the event said controller determines that an ID card has been connected to the first interface;
        iii) voids processing relating to the recording of iris information from the ID card connected to the first interface onto a memory card, which has been connected to said second interface, together with image data that has been generated by said digital image data generator, in response to the controller determining that the ID card connected to the first interface contains no iris information recorded thereon; and
        iv) records the iris information read from the ID card connected to the first interface on the memory card, which has been connected to said second interface, together with image data that has been generated by said digital image data generator in the event that:
            a) said controller determines that an ID card has been connected to the first interface;
            b) said controller determines that the ID card connected to the first interface has iris information recorded thereon; and
            c) said check unit determines that the iris information newly obtained by said obtainment unit and the iris information having been recorded in the ID card match.

2. A method for recording a captured image as digital image data in a digital camera having a viewfinder, comprising the steps of:
    digitizing an output signal from an image sensor disposed in a focal plane;
    obtaining iris information of a photographer by turning on a light emitting unit in the viewfinder for informing the photographer of a focus detecting area of said digital camera;
    connecting, through a first interface, an ID card on which iris information has been recorded, wherein the first interface is configured to accept a plurality of ID cards, each with the iris information of a different digital camera user;

recording the iris information of a photographer obtained by said obtaining step in the ID card;

checking whether iris information newly obtained by said obtaining step and iris information having been recorded in the ID card in said recording step and connected with the first interface match, when the power to the digital camera is turned on and immediately after the ID card is changed;

connecting, through a second interface, a memory card that records digital image data;

a first determining step of determining whether an ID card has been connected to the first interface in response to the turning on of the supply of power to the digital camera;

a second determining step of determining whether the ID card connected to the first interface has iris information recorded thereon in the event the first determining step determines that an ID card has been connected to the first interface;

voiding processing relating to the recording of iris information from the ID card connected to the first interface onto a memory card, which has been connected to the second interface, together with image data that has been generated by said digitizing step, in response to said second determining step determines that the ID card connected to the first interface contains no iris information recorded thereon; and recording the iris information read from the ID card connected to the first interface on the memory card, which has been connected to the second interface, together with image data that has been generated in said digitizing step in the event that:
  a) said first determining step determines that an ID card has been connected to the first interface;
  b) said second determining step determines that the ID card connected to the first interface has iris information recorded thereon; and
  c) said checking step determines that the iris information newly obtained by said obtaining step and the iris information having been recorded in the ID card match.

\* \* \* \* \*